United States Patent [19]

Fischer et al.

[11] Patent Number: 5,016,744
[45] Date of Patent: May 21, 1991

[54] CLUTCH DISC FOR A FRICTION CLUTCH

[75] Inventors: Matthias Fischer, Euerbach; Rainer Wiedmann; Kurt Fädler, both of Neiderwerrn; Harald Jeppe, Schweinfurt, all of Fed. Rep. of Germany

[73] Assignee: Fichtel & Sachs AG, Schweinfurt, Fed. Rep. of Germany

[21] Appl. No.: 468,561

[22] Filed: Jan. 23, 1990

[30] Foreign Application Priority Data

Feb. 8, 1989 [DE] Fed. Rep. of Germany ....... 3903651
Jun. 29, 1989 [DE] Fed. Rep. of Germany ....... 3921283

[51] Int. Cl.⁵ .............................................. F16D 3/66
[52] U.S. Cl. .............................................. 192/106.2
[58] Field of Search ....................... 192/106.2; 464/68

[56] References Cited

U.S. PATENT DOCUMENTS

| | | | |
|---|---|---|---|
| 4,453,838 | 6/1984 | Loizeau | 192/106.2 X |
| 4,635,780 | 1/1987 | Wiggen | 192/106.2 |
| 4,684,007 | 8/1987 | Maucher | 192/106.2 |
| 4,697,682 | 10/1987 | Alas et al. | 192/106.2 |
| 4,763,767 | 8/1988 | Lanzarini et al. | 192/106.2 |
| 4,890,712 | 1/1990 | Maucher et al. | 192/106.2 |

FOREIGN PATENT DOCUMENTS

| | | |
|---|---|---|
| 3340896 | 5/1985 | Fed. Rep. of Germany . |
| 3532951 | 3/1987 | Fed. Rep. of Germany . |
| 1208127 | 2/1960 | France . |
| 1422619 | 11/1965 | France . |
| 1597398 | 7/1970 | France . |
| 2186091 | 1/1974 | France . |
| 2496786 | 6/1982 | France . |
| 2624236 | 6/1989 | France . |
| 2080488 | 2/1982 | United Kingdom . |

Primary Examiner—Rodney H. Bonck
Attorney, Agent, or Firm—Toren, McGeady & Associates

[57] ABSTRACT

It is proposed for the clutch disc of a motor vehicle friction clutch that one of the lateral discs of a torsional vibration damper of the clutch disc be mounted via a radially resilient mounting ring on a cylindrical bearing face of a hub of the clutch disc. The mounting ring has a closed annular part which is fixed radially and axially in a central opening of the lateral disc and, on its internal periphery, has a substantially conical, preferably radially slotted, radially resilient connecting region. On its internal periphery, the connection region is provided directly or via a shaped-on tube region with a cylindrical opposing bearing face which rests substantially without initial tension on the bearing face of the hub. Spacer blocks limit the radial spring path and are used for the non-rotational guidance of the mounting ring on the lateral disc.

7 Claims, 5 Drawing Sheets

CLUTCH DISC FOR A FRICTION CLUTCH

BACKGROUND OF THE INVENTION

The invention relates to a clutch disc for a friction clutch, in particular of a motor vehicle.

From DE-A-3,340,896(U.S. Pat. No. 4,635,780) a friction clutch disc is known which comprises a hub with a hub disc which projects from the hub radially to an axis of rotation of the hub and with a cylindrical bearing face axially to the side of the hub disc and two lateral discs which are arranged axially on either side of the hub disc. The two lateral discs are rigidly connected to one another to form a unit together with the friction linings of the clutch disc and are rotatable relative to the hub disc about a limited angle of rotation. Each lateral disc has a central opening through which the hub passes. Several springs couple the lateral discs rotatably to the hub disc. A plastics mounting ring which is held non-rotatably in the central opening of a first lateral disc of the two lateral discs guides the two lateral discs on the hub. The mounting ring has the form of an annular disc which rests axially laterally on the lateral disc and from whose internal periphery spring tongues shaped to a cone extend through the central opening in the lateral disc. The spring tongues carry the lateral disc in their base region and lie with their ends under radial tension on a cylindrical bearing face of the clutch disc hub. A mounting ring of this type which can be produced inexpensively holds the lateral discs without clearance on the hub and compensates production tolerances.

It has been found that a mounting ring of the known type can compensate for errors of alignment between gearbox shaft and crankshaft only to a limited extent. In particular, with engine/gearbox constructions in which the gearbox shaft is no longer mounted in a pilot bearing of the crankshaft, as previously the case, relatively great errors of alignment between gearbox shaft and crankshaft can occur and can impair the operation of a torsional vibration damper provided in the clutch disc. Although the basic friction of the torsional vibration damper caused by the known mounting ring is relatively slight, it is still too great for a plurality of applications and detrimentally affects the damping devices of the torsional vibration damper, particularly if errors of alignment between the gearbox shaft and the crankshaft or inclination errors of these shafts occur. With the known clutch disc, the spring tongues lie with their tongue edges on the hub, leading to increased edge pressure, increased wear and differing coefficients of friction. A primary object of the invention is to provide a clutch disc provided with a torsional vibration damper, in which even relatively great errors of alignment between gearbox shaft and crankshaft can be compensated without impairing operation of the torsional vibration damper.

SUMMARY OF THE INVENTION

The invention concerns an improvement of a clutch disc of the type described above. The annular part of the mounting ring is held with its outer periphery in the central opening of the lateral disc and carries an annular flange which projects radially outwards and axially fixes the annular part relative to the lateral disc. A resilient connecting region which is inclined to the axis of rotation projects from an internal periphery of the annular part and carries a cylindrical opposing bearing face resting substantially without radial tension on the cylindrical bearing face of the hub.

As the lateral disc is supported radially on the annular part, which is closed in the peripheral direction, changes in the position of the connecting region in the case of errors of alignment do not affect the position of the annular part relative to the lateral disc. This has a beneficial effect on the tolerance compensating properties of the mounting ring and reduces the effects on the torsional vibration damper of the clutch disc, particularly if axial end faces of the mounting ring facing the hub disc simultaneously form frictional faces of frictional devices of the torsional vibration damper. The connecting region of the mounting ring is constructed such that the opposing bearing face of the mounting ring resting on the hub rests substantially without radial tension, reducing the basic friction of the friction damper. As the opposing bearing face is also cylindrical, edge pressure of the type which can occur with the known mounting ring is substantially reduced. The mounting ring provided in the scope of the invention allows undesirable effects due to errors of alignment between the gearbox shaft and the crankshaft and the relative movements thereof to be kept away from the torsional vibration damper.

In a preferred embodiment, at least three stop blocks which are mutually offset in the peripheral direction are formed on the mounting ring, which is preferably constructed as a one-piece plastics moulding, to limit the radial deflection of the resilient connecting part, the stop blocks projecting beyond the annular part radially to the hub but ending at a radial distance from the hub. The stop blocks which are preferably arranged at equal peripheral intervals ensure that alignment errors occurring in operation, for example due to vibrations or the like, do not damage the resilient connecting region and, in particular, the opposing bearing face connected to this connecting region. The connecting region is preferably provided, directly adjacently on either side of each stop block, with radial slots which are open toward the opposing bearing face and extend substantially to the annular part. The stop blocks which are rigid in comparison with the resilient connecting region do not affect the spring properties of the connecting region. With a comparatively small number of stop blocks, the connecting region can additionally be divided by similar slots into segments whose spring properties can be controlled better owing to the consequently reduced peripheral length of each segment. However, the slots do not extend through the annular part.

To secure the mounting ring against torsion, at least one of the stop blocks projects radially outwards beyond the outer periphery of the annular part in the form of a nose which engages in a recess on the periphery of the central opening of the lateral disc.

The opposing bearing face can be shaped directly on an end portion of the connecting region adjacent to the hub. In such a case, the annular part and the connecting region preferably define a U-shaped or V-shaped cross-sectional profile of the mounting ring.

In a variation of the mounting ring, however, the opposing bearing face can also be formed on a tube region which is closed substantially in the form of a ring and is held radially resiliently in the annular part by the connecting region corresponding to a substantially Z-shaped or S-shaped cross-sectional profile of the mounting ring. In this way, the region of the opposing mounting face can be designed independently of the resilient connecting region. The tube region can be completely closed in the form of a ring; however, the above-mentioned radial slots can also extend through the tube region.

In an advantageous embodiment, the opposing bearing face extends substantially over the entire axial height of the tube region so particularly low surface pressure can be achieved. Alternatively, however, the tube region can also be conical in shape, the opposing bearing face extending over only a proportion of the axial height of the tube region so that the resilience of the tube region can be used for calculating the radial spring properties of the mounting ring. The opposing bearing face can be arranged both in the region of the transition from the connecting region into the tube region and on the tube region at a distance from this transition.

A level frictional face which is perpendicular to the axis of rotation is preferably provided on the side of the annular part axially facing the hub disc so that the mounting ring can simultaneously be used as a component of a frictional device of the torsional vibration damper. To obtain additional space for further components, in particular of frictional devices, the annular part preferably carries an axially projecting annular projection of which the end face forms the frictional face.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
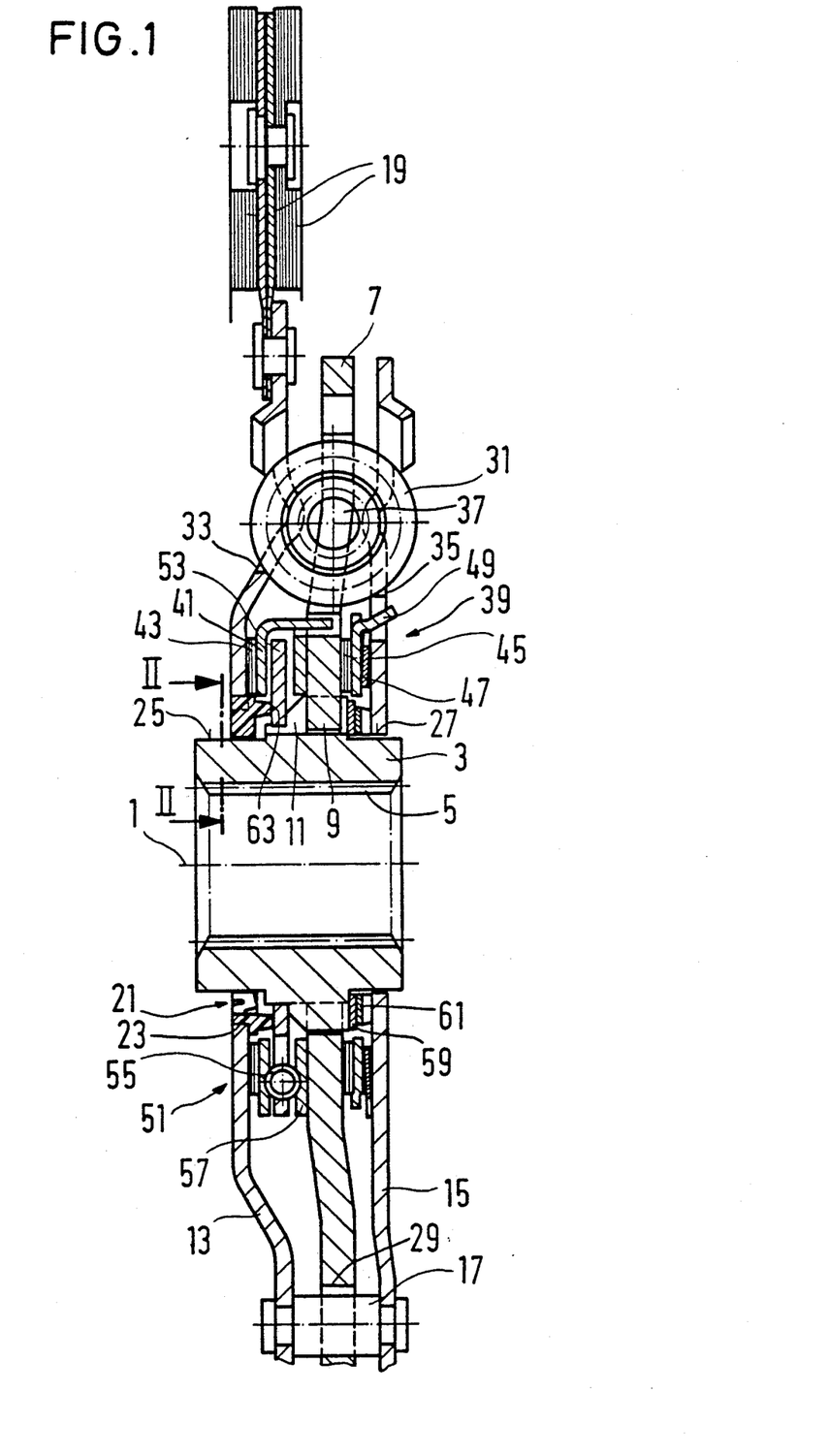
FIG. 1 shows a sectional view of an embodiment of a clutch disc of a motor vehicle friction clutch according to the invention.

The clutch disc shown in FIG. 1 comprises a hub 3 which is coaxial with an axis of rotation 1 of a gearbox input shaft not shown in detail and can be coupled non-rotatably but axially movably to the gearbox shaft via its internal teeth 5. The hub 3 carries an annular disc shaped, substantially radially projecting hub disc 7 which is coupled non-rotatably via internal teeth 9 but with limited rotational clearance to external teeth 11 of the hub 3. Lateral discs 13, 15 are arranged axially on either side of the hub disc 7 and are connected rigidly by spacer rivets 17 to form a unit. The lateral disc 13 carries clutch friction linings 19. The lateral disc 13 provided with the clutch friction linings 19 is rotatably mounted axially to the side of the hub disc 7 on a cylindrical outer peripheral face 25 of the hub 3 via a plastics mounting ring 21 which is described in more detail hereinafter and is inserted into a central opening 23 in the lateral disc 13. The hub 3 passes with radial clearance through a central opening 27 in the other lateral disc 15. The spacer rivets 17 penetrate openings 29 in the hub disc 7 and simultaneously limit the angle of rotation of the lateral discs 13, 15 relative to the hub 3.

The lateral discs 13, 15 are rotatably coupled to the hub disc 7 via several helical springs 31, which are mutually offset in the peripheral direction and of which only one is shown, and to the hub 3 via the teeth 9, 11. The helical springs 31 rest in windows 33, 35, 37 which are orientated axially relative to one another of the lateral discs 13, 15 on the one hand and the hub disc 7 on the other hand. The springs 31 form a torsional vibration damper which is effective during operation under load and which is provided with a load frictional device 39 arranged between the lateral discs 13, 15. The load frictional device 39 comprises a frictional ring 43 arranged between the lateral disc 13 and a thrust collar 41 supported on the hub disc 7 as well as a further frictional ring 45 which is supported on the hub disc 7 and is pressed by a spring washer 47 supported on the lateral disc 15 via a thrust collar 49 guided non-rotatably on the lateral disc 15 against the hub disc 7.

The load torsional vibration damper 39 is effective only after compensation of the rotational clearance of the teeth 9, 11. The rotational clearance determines the operating range of a torsional vibration damper 51 which is designed for idling and comprises a further hub disc 53 held non-rotatably on the hub 3 and at least one helical spring 55 by means of which the hub 3 is rotatably coupled to the lateral disc 13. The spring 55 rests in recesses which are orientated axially to one another in a lateral disc 57 connected non-rotatably to the hub disc 7 and of the thrust collar 41 on the one hand and the hub disc 53 on the other hand. A frictional device designed for idling comprises an axially acting undulating spring 61 which is supported between the lateral disc 15 on the one hand and via a thrust collar on the hub 3 on the other hand and pretensions a frictional face 63 formed by the mounting ring 21 against the hub disc 53.

Figure 4:
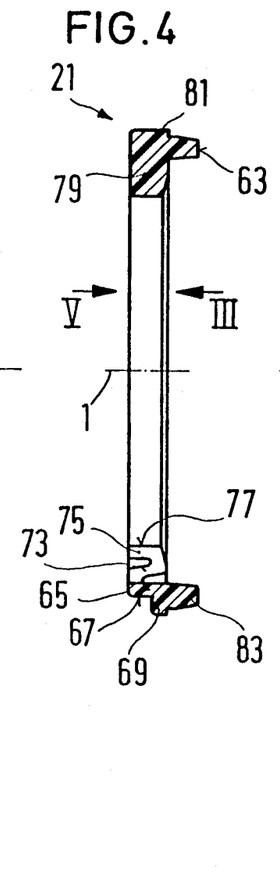
FIG. 4 shows a sectional view of the mounting ring.

During operation of the friction clutch, the friction linings 19 and therefore the lateral discs 13, 15 rotate about the axis of rotation of the engine crankshaft while the hub 3 rotates round the axis of rotation 1 of the gearbox input shaft. Alignment and inclination errors of the two shafts stress the components of the torsional vibration dampers 39, 51 and in particular of the frictional devices thereof. To avoid this, the mounting ring 21 guides the lateral disc 13 radially resiliently on the hub 3. As shown most clearly in FIGS. 2 to 5, the mounting ring 21 which is composed of plastics material, which is flexible at least to a limited extent, and is constructed as a one-piece plastics moulding comprises a closed annular part 65 which passes through the central opening 23 in the lateral disc 13 and is fixed radially with its outer periphery 67 in the central opening 23 of the lateral disc 13. On the side axially facing the hub disc 7, an annular flange 69 which rests on the lateral disc 13 and axially fixes the mounting ring 21 projects radially outward. A substantially annularly conical connecting region 73 up to radial slots 71 which are described in more detail hereinafter extends from the internal periphery of the annular part 65 to the hub 3. Adjacent to the hub, the connecting region 73 passes into a tube region 75 which is also annular up to the slots 71 and of which the internal peripheral face forms a cylindrical opposing bearing face 77 resting on the cylindrical bearing face 25 of the hub 3. As shown most clearly in FIG. 4, the mounting ring 21 has a substantially z- or s-shaped cross-sectional profile, and the conical connecting region 73, i.e. extending at an inclination to the axis of rotation 1, ensures, due to its resilience, that the tube region 75 can be radially resiliently offset relative to the annular part 67. The slots 71 are open toward the opposing bearing face 77 and extend radially through the tube region 75 and the connecting region 73 up to the annular part 65. The tube region 75 and the connecting region 73 is thus divided into segments which are separated from one another in the peripheral direction, and this promotes the spring properties.

Figures 2, 7:
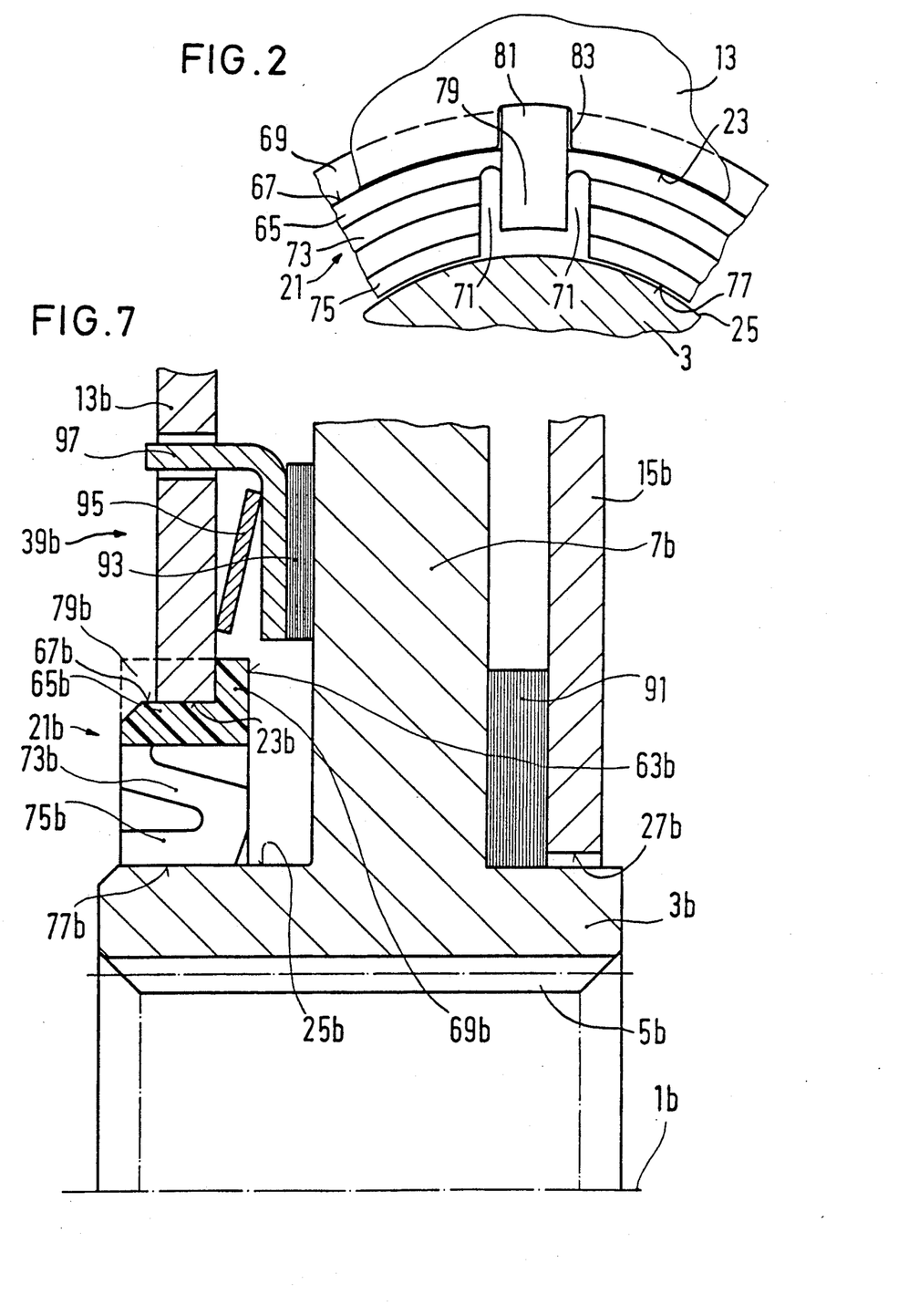
FIG. 2 shows a detailed view of the clutch disc, as viewed along a line II—II in FIG. 1.
FIG. 7 shows a partial sectional view of a further variation of the clutch disc according to FIG. 1.
Figure 3:
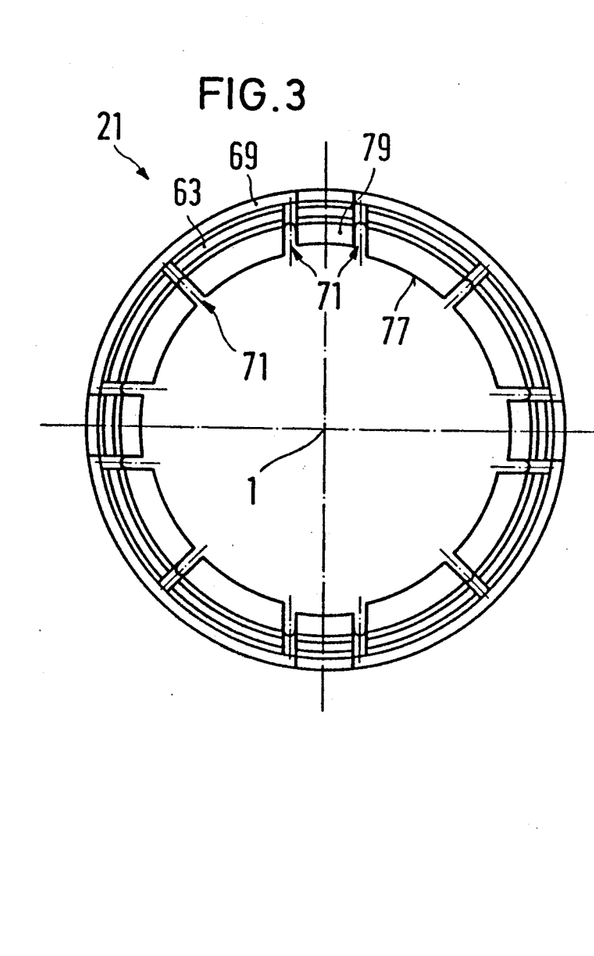
FIG. 3 shows a side view of a mounting ring of the clutch disc according to FIG. 1, as viewed in the direction of an arrow III in FIG. 4.
Figure 5:
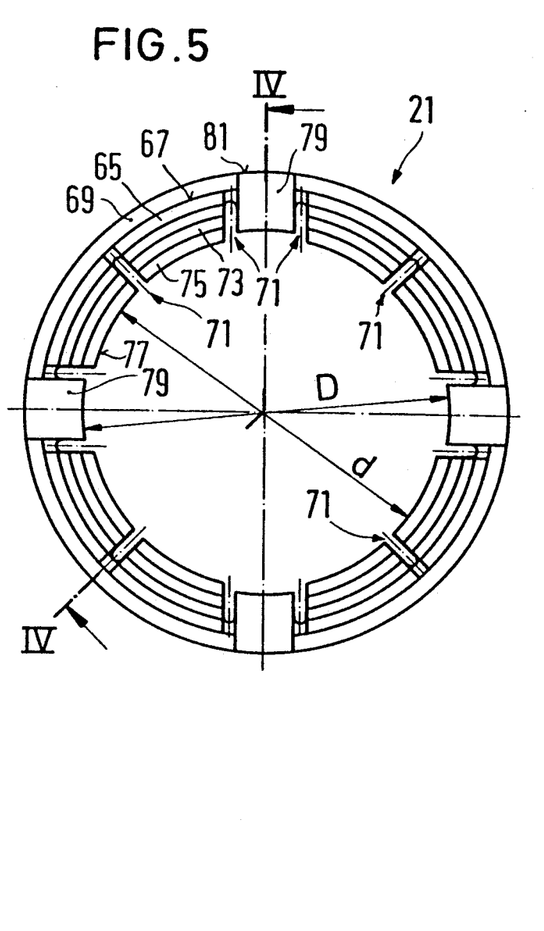
FIG. 5 shows a side view of the mounting ring, as viewed in the direction of an arrow V in FIG. 4.

Mutually offset at equal intervals in the peripheral direction, a plurality of spacer blocks 79, four in this case, which project inwardly beyond the annular part 65 toward the hub 3 but at a distance from the bearing face 25 of the hub 3 are formed on the annular part 65 (FIG. 2). The clearance D of the spacer blocks 79 is therefore greater than the internal diameter d of the opposing bearing face 77 of the tube region 75 (FIG. 5). The spacer blocks 79 restrict the maximum spring path of the connecting region 73 and thus prevent damage to the mounting ring 21 in the case of excessive errors of alignment.

The spacer blocks 79 are extended radially outward beyond the outer periphery 67 of the annular part 65 and here form noses 81 which engage in complementary recesses 83 in the central opening 23 of the lateral discs 13 and guide the mounting ring 21 non-rotatably on the lateral disc 13. Each of the spacer blocks 79 is limited in the peripheral direction on either side by immediate adjacent slots 71 which separate the spacer blocks 79 from the adjacent portions of the connecting region 73 or of the tube region 75.

The dimensions of the mounting ring 21 are selected such that the opposing bearing face 77 in the installed state of the mounting ring 21 rests substantially without clearance but substantially also without tension of the bearing face 25 of the hub 3. Owing to the inherent elasticity of the plastics material, the connecting region 73 compensates alignment errors and inclinations between the crankshaft of the internal combustion engine and the gearbox input shaft. As the opposing bearing face 77 extends substantially over the entire axial height of the tube region 75, slight surface pressure is produced. The tension, which is preferably completely absent, of the mounting ring 21 relative to the bearing face 25 of the hub 3 ensures very slight basic friction of the idling torsional vibration damper 55 owing to the bearing friction. On the other hand, the mounting ring 21 is used for friction damping during idling and, for this purpose, carries on its side axially facing the hub disc 53 an annular projection 83 of which the axial end face forms the above-mentioned friction face 63.

Variations of the clutch disc according to FIGS. 1 to 5 are described hereinafter. Similarly acting components are provided with the reference numerals according to FIGS. 1 to 5 and with a letter to distinguish them. For explanation of the construction and the mode of operation, reference is made to the description of FIGS. 1 to 5.

Figure 6:
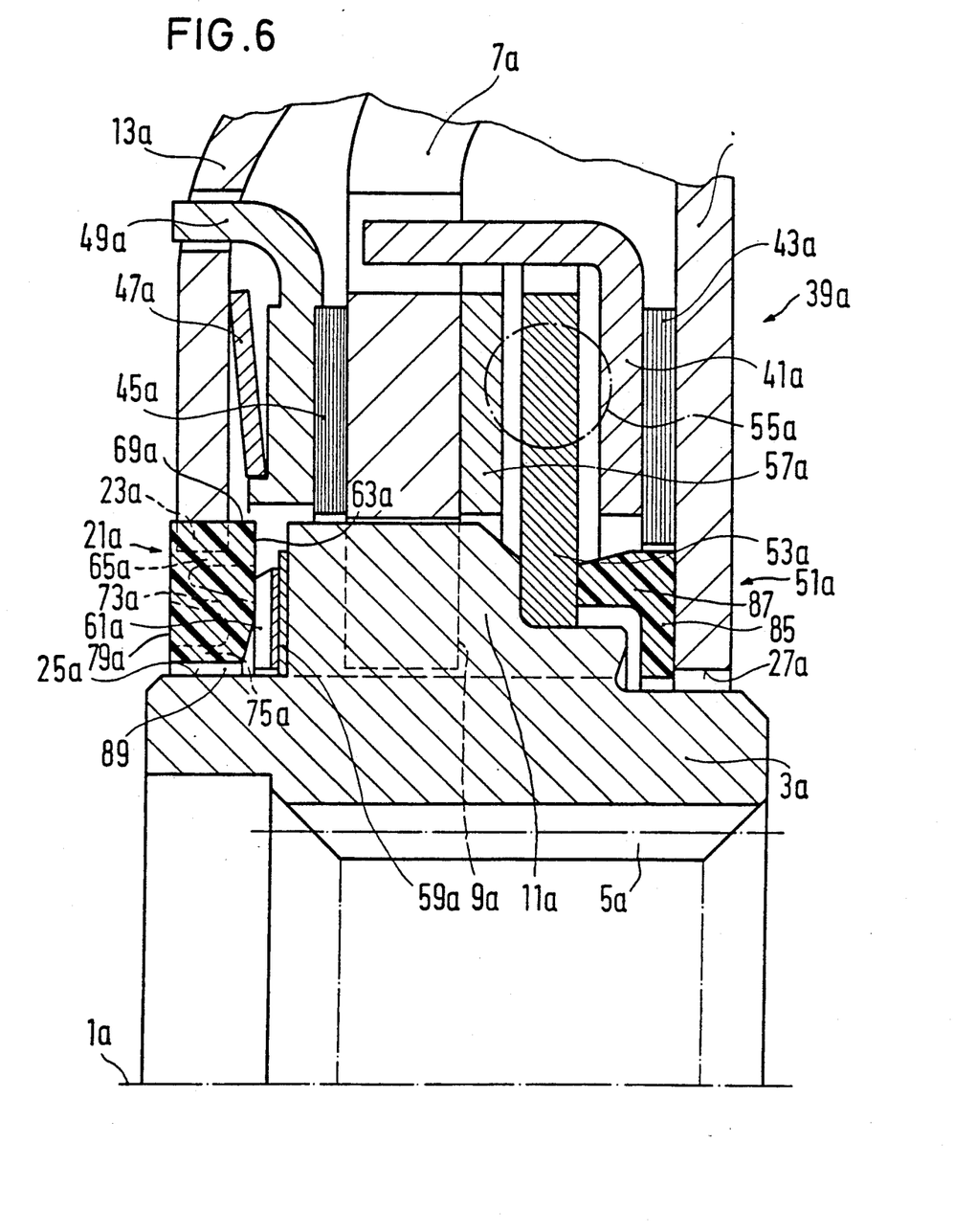
FIG. 6 shows a partial sectional view of a variation of the clutch disc according to FIG. 1.

The clutch disc shown in FIG. 6 differs from the clutch disc shown in FIGS. 1 to 5 predominantly by the design of the frictional devices of the main torsional vibration damper 39a and the idling torsional vibration damper 51a. The friction ring 43a, the thrust collar 41a acting as lateral disc of the idling torsional vibration damper 51a, the hub disc 53a and the lateral discs 57a, in the case of the clutch disc shown in FIG. 6, are arranged on the side of the hub disc 7a axially remote from the mounting ring 21a while the friction ring 45a, the spring washer 47a and the thrust collar 49a are provided on the side of the hub disc 7a adjacent to the mounting ring 21a. Consequently, the axially acting springs 61 and the friction ring 59a of the idling torsional vibration damper 51a are adjacent to the mounting ring 21a, the spring 61a resting directly on the friction face 63a of the mounting ring 21a formed by an end face of the mounting ring 21a perpendicular to the axis of rotation 1a. A friction ring 85 which rests with the axial end face of an annular projection 87 on the hub disc 53a is arranged on the side of the hub disc 53a axially remote from the mounting ring 21a. As both the spring 61a and the ring 59a are produced from metal, the friction between these components is greater than between the spring 61a and the friction face 63a, so that the mounting ring 21a is used directly as frictional element. FIG. 6 shows the mounting ring 21a in a section through the spacer block 79a. The connecting region 73a and the tube region 75a are indicated by broken lines. The mounting ring 21a as well as its arrangement on the lateral disc 13a also corresponds to the mounting ring of the clutch disc shown in FIGS. 1 to 5. The radial distance between the spacer blocks 79a and the bearing face 25a of the hub 3a, which establishes the maximum radial spring path, is shown at 89.

FIG. 7 shows a variation of the clutch disc in which, in contrast to the clutch discs shown in FIGS. 1 to 6, the hub disc 7b is connected rigidly, i.e. without rotational clearance, to the hub 3b. The load friction damper 39b comprises a frictional device with a friction ring 91 arranged between the lateral disc 15b and the hub disc 7b, a friction ring 93 arranged between the lateral disc 13b and the hub disc 7b and a spring washer 95, which is arranged axially between the lateral disc 13b and a thrust collar 97 guided non-rotatably relative to the lateral disc 13b, and clamps the friction ring 93 between the thrust collar 97 and the hub disc 7b. An idling frictional device is not provided for the sake of simplicity in the clutch disc shown in FIG. 7. However, with regard to its construction and its mode of operation, the mounting ring 21b corresponds to the mounting ring of the clutch disc according to FIG. 6. The annular gap formed by the central opening 27b of the lateral disc 15b toward the hub 3b has a radial height which is greater than the maximum spring path of the mounting ring 21b, as established by the spacer blocks 79b. Furthermore, the clutch disc shown in FIG. 7 corresponds to the clutch disc shown in FIG. 1.

Figure 8:
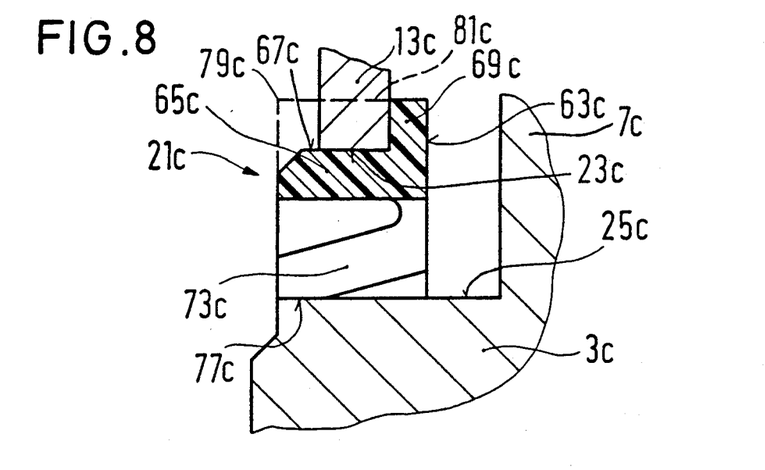
FIGS. 8 to 10 show partial sectional views of variations of the mounting rings provided in the clutch discs shown in FIGS. 1 to 7.

FIG. 8 shows a variation of a mounting ring 21c which can be used in the clutch discs according to FIGS. 1 to 7 and differs from the mounting rings described hereinbefore substantially only by the design of the connecting region and of the tube region. The mounting ring 21c again comprises, in particular, a closed annular part 65c which rests with its outer peripheral face 67c in a central opening 23c of the lateral disc 13c and, on the side axially adjacent to the hub disc 7c, carries an annular flange 69c which projects radially outward. The annular flange 69c fixes the mounting ring 21c which is also constructed as a one-piece plastics moulding axially on a lateral face of the lateral disc 13c. The end face 63c which axially faces the hub disc 7c and extends perpendicularly to the axis of rotation can be used for producing a frictional force in a manner which is not illustrated. A connecting region 73c which tapers conically from the hub disc 7c projects from the internal periphery of the annular part 65c and, at its end remote from the annular part 65c, forms a cylindrical opposing bearing face 77c with which it rests substantially without initial tension on the cylindrical bearing face 25c of the hub 3c. The connecting region is radially slotted according to the mounting rings described hereinbefore, the slots being open toward the opposing bearing face 77c and extending to the annular part 65c. The mounting ring 21c is also provided with spacer blocks 79c which limit the radial spring path of the connecting region 73c and extend radially outward beyond the annular part 65c in the form of noses 81c. For non-rotatably holding the mounting rings 21c, the noses 81c engage in corresponding recesses in the central opening 23c of the lateral disc 13c.

Figure 9:
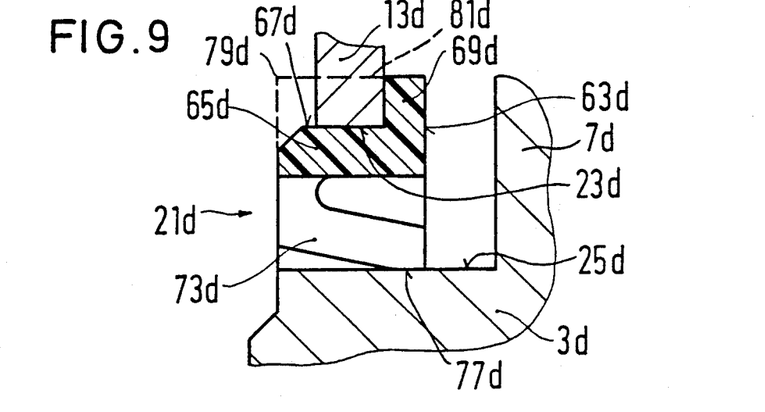

FIG. 9 shows a variation of a mounting ring 21d which differs substantially from the mounting ring 21c substantially only in that the radially slotted, radially resilient connecting region 73d tapers conically toward the hub disc 7d. With this version, the opposing bearing face 77d is also formed directly on the connecting region. Similarly to the mounting ring 21c, the mounting ring 21d also has a substantially U-shaped or V-shaped cross-sectional profile.

Figure 10:
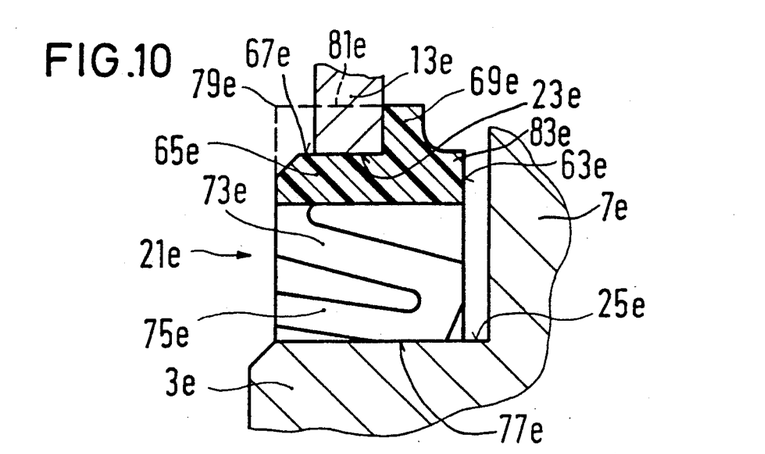

Similarly to the mounting rings shown in FIGS. 1 to 7, the mounting ring 21e shown in FIG. 10 against has a Z- or S-shaped cross-sectional profile and differs from these mounting rings predominantly in that the tube region 75e adjacent to the radially inner end of the connecting region 73e in turn has a conical shape and forms an opposing bearing face 77e which rests substantially without tension on the bearing face 25e and extends merely over a proportion of the axial height of the tube region 75e. In the embodiment illustrated, the connecting region 73e and the tube region 75e taper in the same direction conically toward the hub disc 7e so that the opposing bearing face 77e is adjacent to the transition of the tube region 75e in the connecting region 73e. The portion of the tube region 75e projecting over the opposing bearing face 77e allows the spring properties of the connecting region 73e and of the tube region 75e to be constructionally affected. The tube region 75e and the connecting region 73e are also radially slotted in this case, as described in detail with reference to FIGS. 1 to 5. It goes without saying that the tube region 75e can also be designed to taper conically in the opposite direction to the connecting region 73e so that the maximum spring path of the mounting ring is increased.

The mounting ring 21e also again comprises a closed annular part 65e, which is fixed axially on the lateral disc 13e by an annular flange 69e projecting radially outward, and is provided with spacer blocks 79e for limiting the maximum spring path. In this case also, noses 81e projecting radially outward hold the mounting ring 21e non-rotatably in the central opening 23e of the lateral disc 13e. Similarly to the mounting ring shown in FIG. 1, the mounting ring 21e carries an annular projection 83e which projects axially to the hub disc 7e and whose axial end face 63e could be used for producing frictional force. In contrast to the mounting ring according to FIG. 1, however, the connecting region 73e and consequently also the tube region 75e extends substantially over the entire axial height of the annular part 65e including the projection 83e. The resilient length of the connecting region 73e can be increased in this way.

The transition regions from the connecting region to the to the tube region on the other hand of the mounting rings described above have substantially equally radial cross-sectional dimensions to the connecting region and the tube region. To enable the spring properties to be intentionally influenced, however, these transition regions can also be reinforced or attenuated.

While specific embodiment of the invention have been shown and described in detail to illustrate the application of the inventive principles, it will be understood that the invention may be embodied otherwise without departing from such principles.

What we claim is:

1. A clutch disc for a friction clutch, in particular for a motor vehicle, comprising a hub (3) having a hub disc (7), which projects from the hub radially to an axis of rotation (1) of the hub, and having a cylindrical bearing face (25) axially to the side of the hub disc (7), two lateral discs (13, 15) which are arranged axially on either side of the hub disc (7), are rigidly connected to one another, are rotatable relative to the hub disc (7) through a limited angle of rotation and each have a central opening (23, 27) through which the hub (3) passes, a plurality of springs (31) coupling the lateral discs (13, 15) rotatably to the hub disc (7) and a plastic mounting ring (21) which is held non-rotatably in the central opening (23) of one (13) of the two lateral discs and has an annular part (65), which is closed in the form of a ring and rests on the lateral disc (13), and has a radially resilient connecting region (73) which is inclined to the axis of rotation (1), extends from the annular part (65) to the hub (3) and is supported on the cylindrical bearing face (25) of the hub (3), wherein the annular part (65) is held with its outer periphery (67) in the central opening (23) of the lateral disc (13) and carries an annular flange (69) which projects radially outward and axially fixes the annular part (65) relative to the lateral disc (13), and wherein the connecting region (73) projects from the internal periphery of the annular part (65) and carries a cylindrical opposing bearing face (77) resting substantially without radial tension on the cylindrical bearing face (25) of the hub (3), at least three stop blocks (79) which are mutually offset in the peripheral direction and project beyond the annular part (65) radially to the hub (3), but end at a radial distance from the hub (3), are formed on the annular part (65) to limit the radial deflection of the connecting region (73), the connecting region (73) at least on either side of each stop block (79), being provided directly adjacently with radial slots (71) which are open toward the opposing bearing face (77) and extends substantially to the annular part (65).

2. A clutch disc for a friction clutch, in particular for a motor vehicle, comprising a hub (3) having a hub disc (7), which projects from the hub radially to an axis or rotation (1) of the hub, and having a cylindrical bearing face (25) axially to the side of the hub disc (7), two lateral discs (13, 15) which are arranged axially on either side of the hub disc (7), are rigidly connected to one another, are rotatable relative to the hub disc (7) through a limited angle of rotation and each have a central opening (23, 27) through which the hub (3)

passes, a plurality of springs (31) coupling the lateral discs (13, 15) rotatably to the hub disc (7) and a plastic mounting ring (21) which is held non-rotatably in the central opening (23) of one (13) of the two lateral discs and has an annular part (65), which is closed in the form of a ring and rests on the lateral disc (13), and has a radially resilient connecting region (73) which is inclined to the axis of rotation (1), extends from the annular part (65) to the hub (3) and is supported on the cylindrical bearing face (25) of the hub (3), wherein the annular part (65) is held with its outer periphery (67) in the central opening (23) of the lateral disc (13) and carries an annular flange (69) which projects radially outward and axially fixes the annular part (65) relative to the lateral disc (13), and wherein the connecting region (73) projects from the internal periphery of the annular part (65) and carries a cylindrical opposing bearing face (77) resting substantially without radial tension on the cylindrical bearing face (25) of the hub (3), at least three stop blocks (79) which are mutually offset in the peripheral direction and project beyond the annular part (65) radially to the hub (3), but end an a radial distance from the hub (3), are formed on the annular part (65) to limit the radial deflection of the connecting region (73), at least one of the stop blocks (79) projecting radially outward beyond the outer periphery of the annular part (65) in the form of a nose (81) which, to prevent relative rotation between the annular part (65) and the lateral disc (13), engages in a recess (83) on the periphery of the central opening 23 of the lateral disc (13), the nose (81) ending flush with the annular flange (69).

3. A clutch disc for a friction clutch, in particular for a motor vehicle, comprising a hub (3) having a hub disc (7), which projects from the hub radially to an axis of rotation (1) of the hub, and having a cylindrical bearing face (25) axially to the side of the hub disc (7), two lateral discs (13, 15) which are arranged axially on either side of the hub disc (7), are rigidly connected to one another, are rotatable relative to the hub disc (7) through a limited angle of rotation and each have a central opening (23, 27) through which the hub (3) passes, a plurality of springs (31) coupling the lateral discs (13, 15) rotatably to the hub disc (7) and a plastic mounting ring (21) which is held non-rotatably in the central opening (23) of one (13) of the two lateral discs and has an annular part (65), which is closed in the form of a ring and rests on the lateral disc (13), and has a radially resilient connecting region (73) which is inclined to the axis of rotation (1), extends from the annular part (65) to the hub (3) and is supported on the cylindrical bearing face (25) of the hub (3), wherein the annular part (65) is held with its outer periphery (67) in the central opening (23) of the lateral disc (13) and carries an annular flange (69) which projects radially outward and axially fixes the annular part (65) relative to the lateral disc (13), and wherein the connecting region (73) projects from the internal periphery of the annular part (65) and carries a cylindrical opposing bearing face (77) resting substantially without radial tension on the cylindrical bearing face (25) of the hub (3), the opposing bearing face (77; 77a, b, e) being formed on a tube region (75; 75a, b, e) which is closed substantially in a ring shape and is held radially resiliently in the annular part (65; 65a, b, e) by the connecting region (73) which corresponds to a substantially Z- or S-shaped cross-sectional profile of the plastic mounting ring (21; 21a, b, e).

4. A clutch disc according to claim 3, wherein the opposing bearing face (77; 77a, b) extends substantially over the entire axial height of the tube region (75; 77a, b).

5. A clutch disc according to claim 3, wherein the tube region (75e) has a conical shape, and the opposing bearing face (77e) extends only over a portion of the axial height of the tube region (75e).

6. A clutch disc according to claim 5, wherein the opposing bearing face (77e) is provided in a region of the transition in the connecting region (73e).

7. A clutch disc for a friction clutch, in particular for a motor vehicle, comprising a hub (3) having a hub disc (7), which projects from the hub radially to an axis of rotation (1) of the hub, and having a cylindrical bearing face (25) axially to the side of the hub disc (7), two lateral discs (13, 15) which are arranged axially on either side of the hub disc (7), are rigidly connected to one another, are rotatable relative to the hub disc (7) through a limited angle of rotation and each have a central opening (23, 27) through which the hub (3) passes, a plurality of springs (31) coupling the lateral discs (13, 15) rotatably to the hub disc (7) and a plastic mounting ring (21) which is held non-rotatably in the central opening (23) of one (13) of the two lateral discs and has an annular part (65), which is closed in the form of a ring and rests on the lateral disc (13), and has a radially resilient connecting region (73) which is inclined to the axis of rotation (1), extends from the annular part (65) to the hub (3) and is supported on the cylindrical bearing face (25) of the hub (3), wherein the annular part (65) is held with its outer periphery (67) in the central opening (23) of the lateral disc (13) and carries an annular flange (69) which projects radially outward and axially fixes the annular part (65) relative to the lateral disc (13), and wherein the connecting region (73) projects from the internal periphery of the annular part (65) and carries a cylindrical opposing bearing face (77) resting substantially without radial tension on the cylindrical bearing face (25) of the hub (3), the plastic mounting ring (21c, d) having a substantially U- or V-shaped cross-sectional profile, and the opposing bearing face (77c, d) being formed directly on the internal periphery of the connecting region (73c, d).

* * * * *